Dec. 31, 1957     L. M. MANTELL     2,818,485
VAPORIZER
Filed Sept. 24, 1956

Leon M. Mantell
INVENTOR

United States Patent Office 2,818,485
Patented Dec. 31, 1957

2,818,485
VAPORIZER

Leon M. Mantell, Middle Village, N. Y.

Application September 24, 1956, Serial No. 611,442

9 Claims. (Cl. 219—38)

This invention relates to an improvement in safety means designed to prevent removal of an electrical unit from an enclosure unless the circuit through the unit is opened. It particularly relates to vaporizers employed to supply a mixture of steam and medicinal vapor to relieve respiratory ailments.

This application is a continuation-in-part of my patent application Serial No. 466,096, filed November 1, 1954, for Vaporizing Apparatus, Patent No. 2,764,666, issued September 25, 1956, and all of the subject matter thereof is incorporated herein by reference.

One type of vaporizer employs an electric resistance heater immersed in water to be vaporized. It is desirable to devise means to prevent the closing of the circuit through the heater unless the unit is in place in the water container, and the mouth of the container is sealed. This is especially true where the resistance unit is suspended from the lid by hinged metal straps, since the hinges carry the electric current to the resistance unit and are not covered by electric insulation.

An object of this invention is to make it substantially impossible, in ordinary course of use, to send electric current through the heater unless the lid covers the vaporizing chamber, and to make it impossible to remove the heater without first breaking the circuit through the heater.

Another object is to achieve these results in a unit easily put in place, easily fastened there, and easily removed.

Another object is to keep all exposed electric connectors on the lid and container out of circuit with respect to either, or preferably both, of the power leads, unless the lid is in place on the container.

This application is principally directed to an apparatus in which the water container carries a flange or rim at, or on, or against, or adjacent its mouth, which rim carries one to four electric connectors, preferably electric lead posts. This or these posts connect into the electric heater circuit carried by the lid and serve to complete the circuit through the heater. The apparatus is preferably so designed that the lid, carrying the water heater on its lower face, is placed or pushed down to seat upon the rim, the posts on the rim fitting into electric receptacle or plug-in openings in the lower face of the lid. The lid is fastened to the container by means of an outer screw-threaded ring, the ring having a rim which seats on or in the lid.

The drawing illustrates this preferred embodiment:

Figure 1:
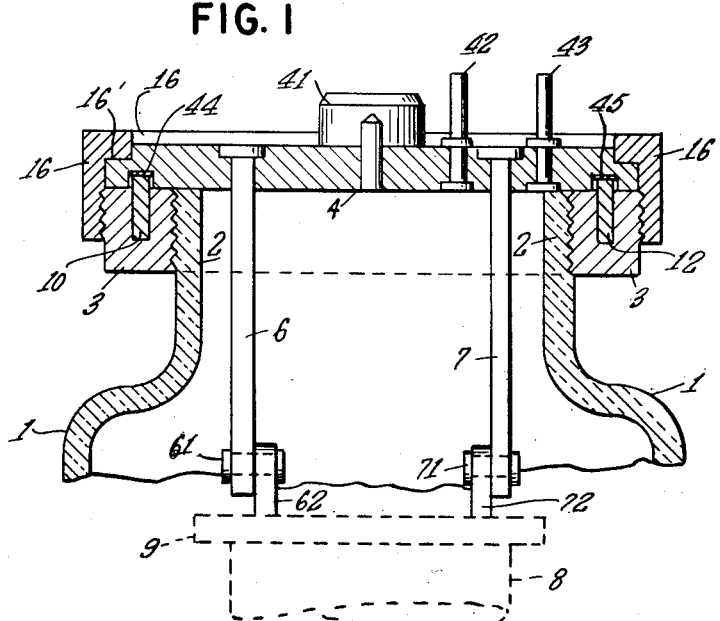
Fig. 1 is a vertical view, partly in section.

The apparatus includes a glass vessel 1 provided with an externally threaded neck 2 which engages or seats an internally and externally threaded annular ring or flange 3 so attached thereto. Seated on the ring is a lid 4 which carries or includes a steam spout 41. The lid suspends two conducting bare metal straps 6 and 7 which have bare hinges 61 and 71 which pivot and support metal brackets 62, 72. The latter are in series with a coil 8′ in electric resistance heater 8. The casing of heater 8 may be of ceramic material. Brackets 62 and 72 suspend the heater. Formed on the upper part of the heater is a cup 9 for volatile liquid medicament. The lid carries the usual vapor outlet spout 41.

Annular ring or flange 3 carries one or more conductor posts. In the form illustrated there are four posts, 10, 11, 12 and 13. Only two appear in Fig. 1. All four are shown in the circuit diagram in Fig. 2. The lid 4 carries two connecting posts 42 and 43 which can be plugged into an electric connecting cord, not shown. Alternatively, the plug end of an electric cord can be made integral with the lid, being permanently connected to electric connections in the lid.

Figure 2:
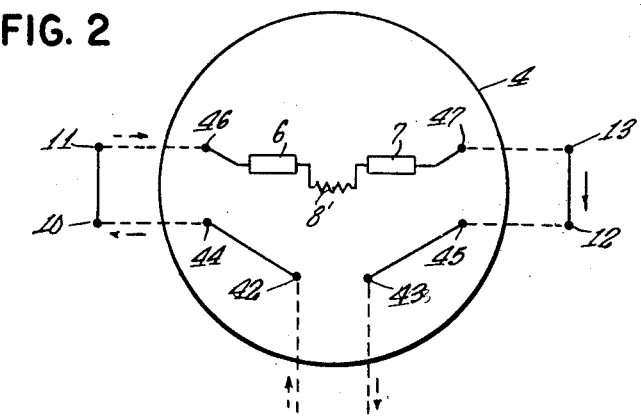
Fig. 2 is a schematic view of an electric circuit for the apparatus.

Diagrammatic Fig. 2 shows the electric circuit when the lid is in place. The posts or power leads 42 and 43 are connected only to recessed receptacle connectors 44 and 45, directly. Neither one of the bare metal straps 6 and 7 is connected to electric potential until the lid is in place. All exposed leads or connectors are dead until the lid is in place. Recessed contacts 44 and 45, in the lower face of the lid, are relatively inaccessible, as much so as in any common wall socket. The structure of recessed contacts 44 and 45 obviously may correspond to that of the contacts in such wall sockets.

The sealing or fastening, internally threaded, metal ring 16 may be that found on ordinary Mason jars. In the drawing, ring 16 is shown provided with an inner screw thread which screws on a corresponding thread on the outside of rim 3. Ring 16 is also provided with a flange 16′ which is adapted to bear down against the flanged end of the lid 4.

Having thus described my invention, I claim:

1. An electrical apparatus comprising structure providing an enclosure, an electrical heating unit in the enclosure, the structure having an aperture leading into the enclosure, removable means covering said aperture, the heating unit being supported by the covering means, an electrical circuit for said electrical device comprising first and second parts, the first part being carried by said covering means, the second part being carried by the said structure, said second part comprising a lead post, said first part including a receptacle electric connector into which the lead post fits.

2. An electrical apparatus comprising structure providing an enclosure, an electrical device in the enclosure, the structure having an aperture leading into the enclosure, removable means covering said aperture, an electric circuit for said electrical device comprising first and second parts, the first part being carried by the covering means, the second part being carried by said structure, said first part including four electric connectors on the inner face of the covering means, at least two of which are recessed in said face, the second part including at least two electrical lead posts that seat in the recessed connectors, the covering means having two leads adapted to be connected to a power source, each of the leads being connected only to a recessed connector.

3. An electrical apparatus comprising structure providing an enclosure, an electrical heating unit in the enclosure, the structure having an aperture leading into the enclosure, removable means covering said aperture, the heating unit being supported by the covering means, an electrical circuit for said electrical device comprising first and second parts, the first part being carried by said covering means, the second part being carried by the said structure, said first part including four electric connectors on the inner face of the covering means, at least two of which are recessed in said face, and the second part including at least two electrical lead posts that seat in the recessed connectors, the covering means having two leads adapted to be connected to a power source, each of the latter leads being connected only to a recessed connector.

4. A steam vaporizer comprising a water container having a mouth, a lid for the mouth, an electric resistance heater suspended from the lid inside the container, two electric terminals carried by the lid and adapted to be connected to an electric current source, a flange carried by the container, means for fastening the lid on the container, four electrical conductors carried by the flange and projecting therefrom, the lid carrying part of the circuit required to connect the two terminals on the lid to the resistance heater, there being four breaks in said part of the circuit, the lid carrying an electrical receptor at each break, the electrical conductors carried by the flange fitting into the receptors and completing the circuit when the lid is in place on the container, two receptors being connected, electrically, to the heater resistance and two to the electric terminals on the lid.

5. A steam vaporizer comprising a water container structure including a container having a mouth, a lid for the mouth, an electric resistance heater suspended from the lid inside the container, two electric terminals carried by the lid for connection to an electric current source, the container structure including a flange carried by the container, means for fastening the lid, an electrical conductor carried by the flange and projecting therefrom, the lid carrying part of the circuit required to connect the two terminals on the lid to the resistance heater, there being a break in said part of the circuit, the electrical conductor carried by the flange fitting into the break and completing the circuit when the lid is in place on the container, the lid being carried by the flange, the means for fastening the lid being an internally threaded ring which is adapted to mate with threads provided upon the container structure, the ring being adapted to press the lid against the flange, the said break in circuit on the lid comprising an electrical connection receptor into which the projecting electrical conductor carried by the flange fits.

6. A steam vaporizer comprising a water container structure including a container having a mouth, a lid for the mouth, an electric resistance heater suspended from the lid inside the container, two electric terminals carried by the lid for connection to an electric current source, the container structure including a flange carried by the container, means for fastening the lid on the container structure, the flange carrying four electrical conductors, the lid carrying part of the circuit required to connect the two terminals on the lid to the resistance heater, there being four breaks in said part of the circuit, the lid carrying at said breaks four mating electrical connectors, two of which are recessed in the surface of the lid and are connected to the two electric terminals carried by the lid, two of the conductors on the flange projecting therefrom and being adapted to seat in the two recessed receptors, the other two of the conductors on the flange being adapted to connect with the other two of the said four connectors carried by the lid.

7. An electrical apparatus comprising an enclosure member, an electrical device in the enclosure thereof, said member having an aperture leading to the enclosure, a peripheral flange attached to said enclosure member, lid means covering said aperture, means for fastening the lid means over the flange, a first part of the electrical circuit for said electrical device being carried by said lid means and a second part by the flange, said second part comprising a lead post, said first part including a receptacle electric connector into which the lead post seats, said first part further including two leads adapted to be connected to a power source, one of said leads being connected to said receptacle electric conductor.

8. An electrical apparatus comprising an enclosure member, an electrical device in the enclosure thereof, said member having an aperture leading to the enclosure, a peripheral flange attached to said enclosure member lid means covering said aperture, means for fastening the lid means over the flange, a first part of the electrical circuit for said electrical device being carried by said lid means and a second part by the flange, said second part comprising a lead post, said first part including a receptacle electric connector into which the lead post seats, said first part further including two leads adapted to be connected to a power source, one of said leads being connected to said receptacle electric conductor, said electrical device being a heating unit supported by the covering means.

9. A steam vaporizer comprising a water container having a mouth, a lid for the mouth, an electric resistance heater suspended from the lid inside the container, two electric terminals carried by the lid and adapted to be connected to an electric current source, a peripheral flange carried by the container, means for fastening the lid on the container, an electrical conductor carried by the flange and projecting therefrom, the lid carrying part of the circuit required to connect the two terminals on the lid to the resistance heater, there being a break in said part of the circuit, the electrical conductor carried by the flange fitting into the break and completing the circuit when the lid is in place on the container.

References Cited in the file of this patent
UNITED STATES PATENTS

| 1,717,040 | Kaufman et al. | June 11, 1929 |
| 2,541,529 | Hunt | Feb. 20, 1951 |